Dec. 16, 1969

H. POOLE 3,484,847

THRUST SPOILING AND SILENCING
IN A GAS TURBINE ENGINE

Filed Dec. 11, 1967

Inventor
Horace Poole
By
Cushman, Darby & Cushman
Attorneys

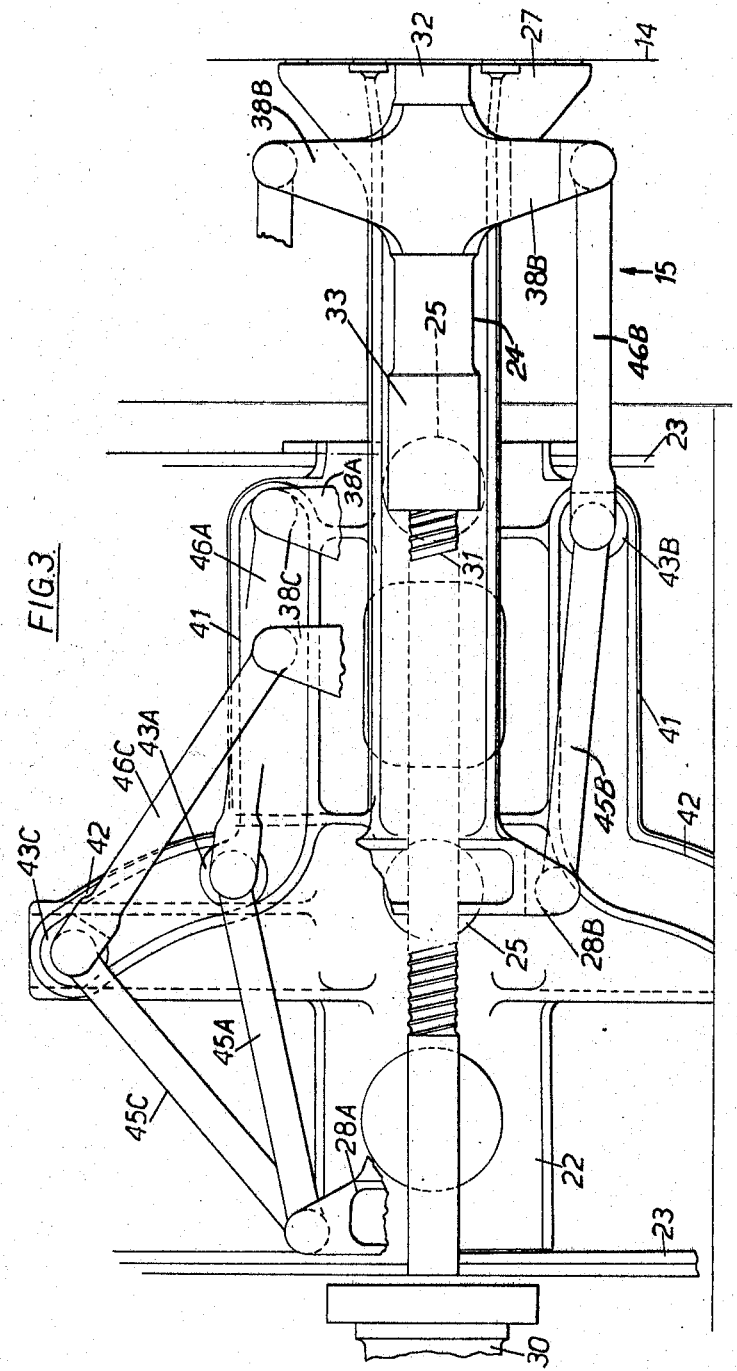

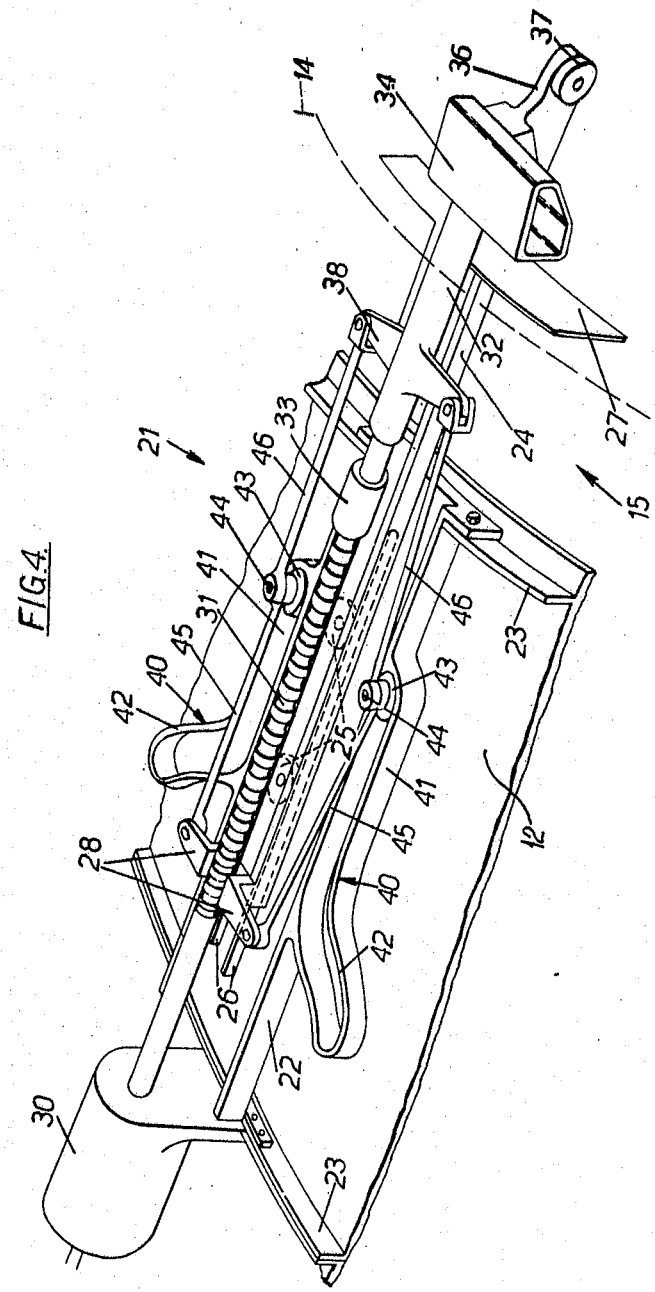

United States Patent Office 3,484,847
Patented Dec. 16, 1969

---

3,484,847
THRUST SPOILING AND SILENCING IN A GAS TURBINE ENGINE
Horace Poole, Nottingham, England, assignor to Rolls-Royce Limited, Derby, England, a British company
Filed Dec. 11, 1967, Ser. No. 689,591
Claims priority, application Great Britain, Jan. 12, 1967, 1,788/67
Int. Cl. F02k 3/02; G01k 11/04; B64c 15/04
U.S. Cl. 60—226                                   12 Claims

ABSTRACT OF THE DISCLOSURE

A gas turbine engine has an exhaust duct which is provided with thrust spoilers and a silencer which are effective when operated to increase and decrease the effective nozzle area of the jet exhaust duct respectively. The thrust spoiler and the silencer are mechanically connected to a common actuator so that they may be operated selectively and independently by the actuator.

---

This invention relates to thrust spoiling and silencing in a gas turbine engine.

According to the invention there is provided a gas turbine engine having a jet exhaust duct which is provided with thrust spoiling means and silencing means which are effective when operated respectively to increase and decrease the effective nozzle area of the jet exhaust duct, and which are mechanically connected to at least one common actuating apparatus such that the thrust spoiling means and silencing means may be operated selectively and independently by said apparatus.

The invention is particularly applicable to gas turbine engines having a fan which is driven by the or a turbine of the engine: increasing the effective nozzle area of the jet exhaust duct of the engine by means of the thrust spoiling means will have the effect of increasing the rotational speed of the turbine or turbines and thereby increase the rotational speed of the fan, while decreasing the effective nozzle area by operating the silencing means will, conversely, cause a reduction in speed of the fan and a reduction, therefore, of the noise generated thereby.

In a preferred embodiment the fan is rotatably mounted within a duct which is coaxial with the axis of the engine and which is provided at its downstream end with thrust reversing means. Said fan thrust reversing means may be operated in conjunction with the thrust spoiling means so that the increase in fan rotational speed caused by operation of the latter may contribute to increased reverse thrust when the fan thrust reversing means are operated.

The or each actuating apparatus preferably includes two axially movable members operatively connected to the thrust spoiling means and the silencing means respectively such that one of said means is actuated by movement of a first one of said members relative to a fixed part of the jet exhaust duct and the other of said means is operated by movement of the second of said members relative to said first member, the said members being movable axially by a common actuator motor.

The said first member is preferably connected by a lost motion link device to the second member, which latter is operatively connected to the actuator motor, such that, in a first range of movement of the second member the link device is effectively rigid and axial motion is transmitted to both said members simultaneously to actuate the said one means, and in a second range of movement of the second member the said link device absorbs the relative motion between the two members permitting the second member to move relatively to the first member to actuate the said other means. Said lost motion link device preferably comprises at least one pair of pivotally interconnected links pivotally connected at opposite ends to the respective first and second members and a respective fixed guide track in which the or each pivotal interconnection is constrained to move, the guide track being linear and parallel to the direction of movement of the said members over a first portion corresponding to the first range of movement of the second member and being arcuate over a second portion corresponding to the second range of movement of the second member. According to a preferred embodiment the first member is operatively connected to the thrust spoiling means and the second member is operatively connected to the silencing means.

The thrust spoiling means may comprise an axially movable exhaust duct portion which in its inoperative position forms a continuation of the exhaust duct and in its operative, thrust spoiling, position is spaced from the remainder of the exhaust duct by an annular gap.

The silencing means may comprise a plurality of hinged flaps which are movable by the actuating apparatus from inoperative positions in which the flaps present substantially no obstruction to exhaust gas flow through the exhaust duct and an operative, silencing, position, in which said flaps extend into the exhaust duct. Said hinged flaps may be attached to the internal surface of the movable exhaust duct portion for movement about respective circumferentially extending hinges.

The invention will be described, merely by way of example, with reference to the accompanying drawings, in which:

FIGURE 3 is a plan view of actuating apparatus forming part of the present invention, viewed in the direction of arrow 3 in FIGURE 2 and illustrating different positions thereof, and FIGURE 4 is a fragmentary perspective view of said actuating apparatus.

Figure 1:
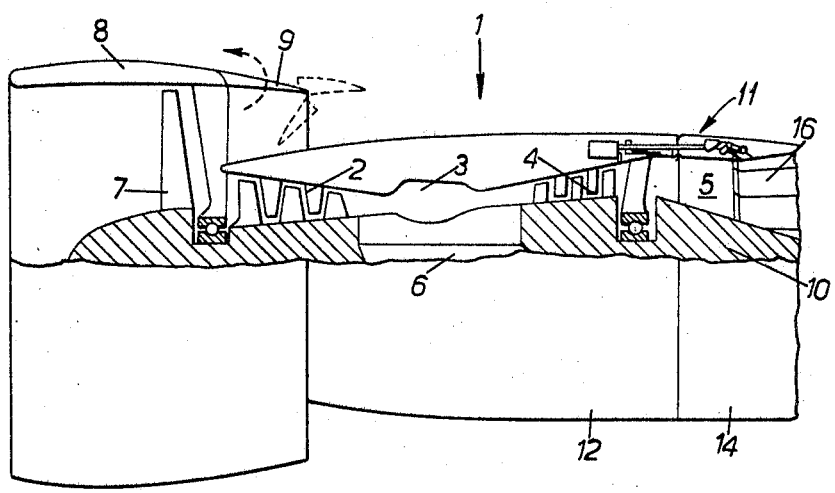
FIGURE 1 is a diagrammatic elevation of a gas turbine engine according to one embodiment of the invention, shown partly in axial section.

FIGURE 1 shows a gas turbine engine 1 having in flow series an axial flow compressor 2, combustion equipment 3, a turbine 4, and exhaust duct 5. The compressor 2 and turbine 4 are rotatably mounted on a common shaft 6.

The shaft 6 carries at its forward end a fan 7 which is housed within a fan duct 8 mounted at the upstream end of the engine 1 coaxially with the axis thereof. The fan duct 8 is provided at its downstream end with thrust reversing means 9 which may be of any convenient known construction. The operative, thrust reversing, position of the thrust reversing means 9, together with the path taken by the fan efflux when the thrust reversing means 9 is operated, is indicated diagrammatically by the arrow 23 in broken lines.

The exhaust duct 5 is defined between a centrally extending exhaust cone 10, which in this embodiment is rotatable with the shaft 6, and an outer wall 11 which forms a smooth continuation of the engine outer casing.

Figure 2:
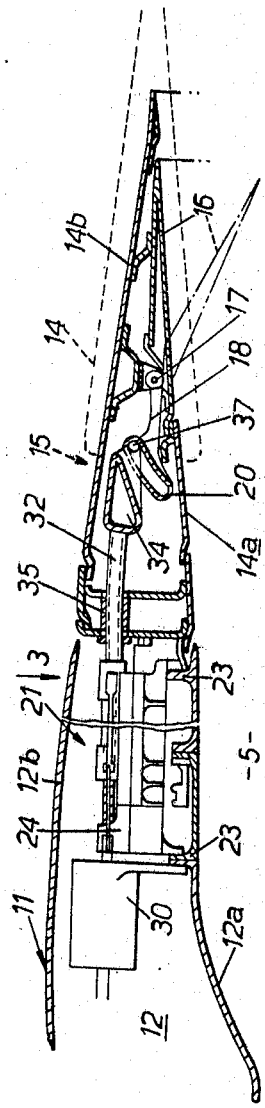
FIGURE 2 is a diagrammatic axial section through part of the exhaust duct of the gas turbine engine shown in FIGURE 1.

As is seen more clearly in FIGURE 2, the exhaust duct outer wall 11 is of hollow construction, and has a fixed upstream portion 12 having inner and outer walls 12a, 12b respectively and an axially movable downstream portion 14 having inner and outer walls 14a, 14b respectively. The axially movable portion 14 acts as a thrust spoiler and, when in its inoperative position, shown in full lines, forms a smooth continuation of the fixed upstream portion 12 of the exhaust duct. When in its operative, thrust spoiling, position, however, the portion 14 is displaced axially in a downstream direction, occupying the position indicated in broken lines, in which it is spaced axially from the downstream end of the fixed portion 12 by an annular gap 15 (FIGURE 4).

The presence of the annular gap 15 in the exhaust duct 5 when the thrust spoiling portion 14 is in its operative position has the effect of increasing the nozzle area of the exhaust duct, thereby reducing the exhaust gas pressure therein and causing the turbine 4 of the engine to increase in speed. The fan 7, being drivingly connected to the turbine 4, is therefore also increased in speed and produces additional thrust. In this way the fan thrust reversing means 9 is rendered more effective in retarding an aircraft in which the engine 1 is mounted when the thrust spoiling portion 14 is in its operative position.

The thrust spoiling portion 14 carries on its inner wall 14a a plurality of hinged silencing flaps 16 which are spaced apart at equal angular intervals around the exhaust duct 5 and which are pivoted about respective hinges 17 which lie on a common circumferentially extending line. Each silencing flap 16 is movable, by actuating apparatus to be described, from an inoperative position, shown in FIGURE 2 in full lines, in which it lies flush with the inner wall 14a, into an operative, silencing, position, shown in chain-dotted lines in FIGURE 2, in which it extends from the inner wall 14a into the exhaust duct 5.

When the silencing flaps 16 are in their operative positions, the effective peripheral area of the jet exhaust nozzle is increased, thereby having a silencing effect on the jet exhaust. At the same time, the effective nozzle area of the exhaust duct 5 is decreased, causing the rotational speed of the turbine 4 to be reduced. The turbine-driven fan 7 is therefore reduced in speed, and as a result the level of noise generated by the fan 7 is reduced.

It will be apparent that the thrust spoiling portion 14 and the silencing flaps 16 are required to be operated at different times, the former for producing maximum fan thrust as, for example, when thrust reversal is to be effected on landing of the aircraft in which the engine 1 is mounted, and the latter for silencing of the fan, as, for example, when the aircraft is taxiing. According to the present invention, common actuating apparatus is provided for operating both the thrust spoiling portion 14 and the silencing flaps 16.

Each silencing flap 16 carries, on the other side of its hinge 17, a lever arm 18 which is disposed within the hollow interior of the portion 14 (FIGURE 2). An arcuate cam track 20 is attached to the end of the lever am 18.

Common actuating apparatus 21 for actuating the thrust spoiling portion 14 and the silencing flaps 16 selectively in the manner described above is illustrated in FIGURES 3 and 4. The actuating apparatus 21 is mounted within the hollow interior of the fixed upstream portion 12 of the exhaust duct wall. A fixed platform 22 is secured to and extends between two upstanding axially separated circumferential flanges 23 provided on the inner wall 12a of the exhaust duct portion 12.

A first axially movable elongated actuating member 24 is provided on its underside with two spaced apart rollers 25 which are located between two axially extending parallel guide rails 26 provided on the platform 22. The member 24 is secured at its downstream end to the upstream end of the axially movable thrust spoiling portion 14 by way of an integral connecting plate 27. At its upstream end the member 24 is provided with two laterally extending lugs 28 which are disposed symmetrically on opposite sides of the longitudinal centre-line of the member 24.

An actuator motor 30 is bolted to the upstream flange 23 on the opposite side thereof to the platform 22 and is drivingly connected to an axially extending rotatable lead screw 31 which extends above and in the same axial plane as the longitudinal centre-line of the member 24. The actuator motor 30 is illustrated as an electric motor but it could, if desired, be an air motor or an hydraulic motor.

A second axially movable tubular actuating member 32 is provided at its upstream end with an integral nut 33 which is threaded on the lead screw 31. The threads of the lead screw 31 are of hemispherical profile and the nut 33 is of the recirculating ball type. At its downstream end the second actuating member 32 is secured to an annular box section member 34 which extends circumferentially within the hollow interior of the thrust spoiling portion 14, the member 32 passing through a cylindrical sleeve 35 in the upstream wall of the portion 14 (FIGURE 2). The member 34 is provided with a plurality of respective arms 36 carrying respective cam rollers 37, so arranged that respective cam rollers 37 engage in respective cam tracks 20 of respective silencing flap lever arms 18. Intermediate its ends the second actuating member 32 carries an integral circumferentially extending cross piece 38.

Disposed symmetrically on opposite sides of the platform 22 and in the plane thereof are two guide tracks 40. Each guide track 40 has a linear axially extending part 41 which merges smoothly at its upstream end with an arcuate outwardly extending part 42. A respective guide roller 43 is disposed within each guide track 40 for movement therein. Each guide roller 43 carries a pivot pin 44 which acts as a common pivot for a respective pair of links, one of which, 45, extends in an upstream direction and is pivotally connected at its other end to the adjacent lug 28 on the first member 24, and the other of which, 46, extends in a downstream direction and is pivotally connected to the adjacent end of the cross piece 38 on the second member 32.

The operation of the actuating apparatus 21 will be described, assuming a starting condition in which the parts are disposed in the relative positions illustrated diagrammatically in FIGURE 2, that is, with both the thrust spoiling portion 14 and the silencing flaps 16 in their inoperative positions, as shown in full lines. In this condition the guide rollers 43 are disposed at the junction of the two parts 41 and 42 of the guide tracks 40 and the parts of the apparatus 21 occupy the positions indicated by the suffix A in FIGURE 3. Thus the first actuating member 24 is at the extreme upstream end of its range of movement, as illustrated by the portion of a lug 28 indicated fragmentarily at 28A, and the thrust spoiling portion 14, is, therefore, in its inoperative position, the gap 15 in the exhaust duct being closed.

If now the actuator motor 30 is rotated in a clockwise direction (as viewed from the downstream end of the lead screw 31) the nut 33 will be moved axially in a downstream direction. The cross piece 38 will therefore move in a downstream direction, drawing the two interconnected pairs of links 45, 46 with it. The two rollers 43 will travel along the linear portions 41 of the guide tracks 40, so that the two pairs of links 45, 46 will act effectively as rigid links, drawing the lugs 28 in a downstream direction until finally the parts occupy the positions indicated by the suffix B in the lower part of FIGURE 3 in which the guide rollers 43B are disposed in the extreme downstream position of the respective guide tracks 40. This is the setting of the apparatus illustrated diagrammatically in FIGURE 4, in which the first member 24 is in its extreme downstream position and the nut 33 at the extreme end of its travel on the lead screw 31. The effect of this movement is to move the thrust spoiling portion 14 downstream to open the annular gap 15, thereby increasing the effective nozzle area of the exhaust duct 5 with a thrust spoiling effect on the engine 1, as explained above. The first actuating member 24 is guided in its axial movement by the rollers 25 moving between the guide rails 26. During this movement of the thrust spoiling portion 14, the links 45, 46 ensure that the first and second actuating members 24, 32 move in unison and consequently there is no relative axial movement between the annular member 34 and the portion 14. The hinged silencing flaps 16 are not, therefore, moved from their inoperative positions during this movement of the thrust spoiling portion 14.

If, starting with the parts in the positions indicated by suffix A the actuator motor 30 is rotated in a counter-clockwise direction (viewed from the downstream end of the lead screw 31), then the nut 33 is advanced in an upstream direction on the lead screw 31. This has the effect of moving the parts to the positions indicated fragmentarily in the upper half of FIGURE 3 by the suffix C. During this movement the two pairs of links 45, 46 rotate about their common pivot pins 44 as the guide rollers 43 move over the respective arcuate portions 42 of the guide tracks 40 to the outer ends thereof, as indicated at 43C. The arcuate portions 42 follow respective arcs of circles which are centered on the positions occupied by the respective pivot pins on the lugs 28 when the latter are in their extreme upstream positions (28A). Thus during the movement of the parts from position A to position C no axial movement of the lugs 28A and, therefore, the first actuating member 24, takes place. Consequently the tubular second actuating member 32 moves in an upstream direction relative to the first actuating member 24. This causes upstream movement of the annular member 34 within the duct portion 14, drawing the cam rollers 37 through the respective cam tracks 20. The resulting movement of the cam tracks 20 causes the lever arms 18 to rock about their respective hinges 17 so as to extend the hinged silencing flaps 16 into their operative positions (shown in chain-dotted lines in FIGURE 2).

It will be seen that the present invention provides a common actuating apparatus 21 for effecting operation of both thrust spoiling and silencing means. If desired, more than one such common actuating apparatus 21 may be provided, the different apparatuses 21 being located at angularly spaced apart positions within the downstream end of the fixed exhaust duct portion 12, the first actuating members 24 of each apparatus 21 being secured to the thrust spoiling portion 14 and the second actuating members 32 to the annular member 34.

I claim:
1. A gas turbine engine comprising:
   (A) a jet exhaust duct having an effective nozzle area;
   (B) thrust spoiling means and silencing means provided on said jet exhaust duct;
   (C) at least one common actuating apparatus for actuating said thrust spoiling means and said silencing means, said thrust spoiling means and said silencing means being effective when operated respectively to increase and decrease the effective nozzle area of said jet exhaust duct, said common actuating apparatus comprising:
      (1) two axially movable members operatively connected to said thrust spoiling means and said silencing means respectively, such that one of said thrust spoiling means and said silencing means is operated by movement of a second of said two axially movable members relative to said first member,
      (2) a common actuator motor for moving said two axially movable members, and
      (3) a lost motion link device connecting the first of said two axially movable members to the second of said two axially movable members which latter is operatively connected to said actuator motor so that:
         (a) in a first range of movement of the second of said two axially movable members, the lost motion link device is effectively rigid and axial motion is transmitted to said two axially movable members simultaneously to actuate the said one of said thrust spoiling means, and said silencing means and
         (b) in a second range of movement of the second of said two axially movable members, the lost motion link device absorbs relative motion between the two axially movable members permitting the second of the same to move relative to the first of the same to actuate the said other of said thrust spoiling means and silencing means.

2. An engine as claimed in claim 1 in which at least one pair of pivotally interconnected links are included in the lost motion link device and are pivotally connected at opposite ends to the respective first and second members and in which a respective fixed guide track is provided in which each pivotal interconnection is constrained to move, the guide track being linear and parallel to the direction of movement of the said members over a first portion corresponding to the first range of movement of the second member and being arcuate over a second portion corresponding to the second range of movement of the second member.

3. An engine as claimed in claim 1 in which an axially extending rotatable lead screw is drivingly connected to the actuator motor, with which lead screw a nut mounted on or integral with the second member is engaged so that rotation of the motor in opposite directions causes axial movement in opposite directions of the said second member.

4. An engine as claimed in claim 3 in which two pairs of interconnected links and two respective guide tracks are provided, the pivotal interconnections thereof being constrained to move in the two respective guide tracks disposed symmetrically on opposite sides of the lead screw.

5. An engine as claimed in claim 1 in which the first member is operatively connected to the thrust spoiling means and the second member is operatively connected to the silencing means.

6. An engine as claimed in claim 1 in which the thrust spoiling means comprises an axially movable exhaust duct portion which in its inoperative position forms a continuation of the exhaust duct and in its operative, thrust spoiling, position is spaced from the remainder of the exhaust duct by an annular gap.

7. An engine as claimed in claim 6 in which the silencing means comprises a plurality of hinged flaps which are movable by the actuating apparatus from inoperative positions in which the flaps present substantially no obstruction to exhaust gas flow through the exhaust duct and an operative, silencing, position in which said flaps extend into the exhaust duct.

8. An engine as claimed in claim 7 in which the said flaps are attached to the internal surface of the movable exhaust duct portion for movement about respective circumferentially extending hinges.

9. An engine as claimed in claim 7 in which each hinged flap has attached thereto a cam track, and the second axially movable member is attached to an annular member carrying a plurality of respective parts which engage in respective said cam tracks to cause pivotal movement of the respective flaps about their hinges on axial movement of the second member.

10. An engine as claimed in claim 9 in which more than one said common actuating apparatus is provided, the respective first axially movable members being attached at angularly spaced apart intervals to the movable exhaust duct portion and each respective said axially movable member being connected to said annular member.

11. An engine as claimed in claim 1 and including a fan which is driven by a turbine of the engine.

12. An engine as claimed in claim 11 in which the fan is rotatably mounted within a duct which is coaxial with the axis of the engine and which is provided at its downstream end with thrust reversing means.

(References on following page)

References Cited

UNITED STATES PATENTS

| | | |
|---|---|---|
| 2,931,171 | 4/1960 | Tyler et al. |
| 2,940,252 | 6/1960 | Reinhart. |
| 2,997,845 | 8/1961 | Oulianoff. |
| 3,024,601 | 3/1962 | Nash ------------ 60—226 X |
| 3,036,431 | 5/1962 | Vdolek ------------ 60—229 |
| 3,096,617 | 7/1963 | Bryant. |
| 3,133,412 | 5/1964 | Westley. |
| 3,280,562 | 10/1966 | Theits et al. ---------- 60—229 |
| 3,344,882 | 10/1967 | Bellion et al. ------- 60—229 X |

AL LAWRENCE SMITH, Primary Examiner

U.S. Cl. X.R.

60—229, 271; 181—33; 239—265.31